(12) United States Patent
Hamperl et al.

(10) Patent No.: US 6,773,029 B2
(45) Date of Patent: Aug. 10, 2004

(54) DEVICE AND METHOD FOR SENSING AN OBJECT OR A PERSON IN THE INTERIOR OF A VEHICLE AND VEHICLE OCCUPANT PROTECTION APPARATUS IN A VEHICLE WITH SUCH A DEVICE

(75) Inventors: Reinhard Hamperl, Köfering (DE);
Gerhard Mader, Thalmassing (DE);
Reinhard Rösl, Bernhardswald (DE);
Christoph Roth, Tokyo (JP); Thomas Stierle, Regensburg (DE); Alexander Waldmann, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/940,050

(22) Filed: Aug. 27, 2001

(65) Prior Publication Data

US 2002/0074786 A1 Jun. 20, 2002

Related U.S. Application Data

(63) Continuation of application No. PCT/EP00/01601, filed on Feb. 25, 2000.

(30) Foreign Application Priority Data

Feb. 25, 1999 (EP) .............................................. 99103697

(51) Int. Cl.⁷ .............................................. B60R 21/32
(52) U.S. Cl. .......................................... 280/735; 701/45
(58) Field of Search ............................ 280/735; 701/45

(56) References Cited

U.S. PATENT DOCUMENTS

| | | | | |
|---|---|---|---|---|
| 4,968,965 A | * | 11/1990 | Naitou et al. | 340/436 |
| 5,178,409 A | * | 1/1993 | Hiramitsu et al. | 280/731 |
| 5,366,241 A | | 11/1994 | Kithil | |
| 5,482,314 A | * | 1/1996 | Corrado et al. | 280/735 |
| 5,835,873 A | * | 11/1998 | Darby et al. | 701/45 |
| 5,847,472 A | * | 12/1998 | Byon | 307/10.1 |
| 5,967,549 A | * | 10/1999 | Allen et al. | 280/730.1 |
| 6,079,738 A | * | 6/2000 | Lotito et al. | 280/734 |
| 6,088,639 A | * | 7/2000 | Fayyad et al. | 180/271 |
| 6,095,554 A | * | 8/2000 | Foo et al. | 280/730.2 |
| 6,223,109 B1 | * | 4/2001 | Paul et al. | 701/1 |
| 6,293,583 B1 | * | 9/2001 | Fujishima et al. | 280/735 |

FOREIGN PATENT DOCUMENTS

| | | |
|---|---|---|
| DE | 44 06 897 C1 | 5/1995 |
| DE | 195 47 333 A1 | 6/1997 |
| WO | PCT/US97/03510 | 10/1997 |

\* cited by examiner

*Primary Examiner*—Lesley D. Morris
*Assistant Examiner*—L. Lum
(74) *Attorney, Agent, or Firm*—Laurence A. Greenberg; Werner H. Stemer; Ralph E. Locher

(57) ABSTRACT

Objects of persons in a vehicle are detected with a sensor. The data of the sensor signal or evaluated sensor data are transmitted to a remote control unit for an occupant protection system. The sensor data are in addition stored in a device comprising the sensor if the control unit indicates that an impact has been recognized.

7 Claims, 2 Drawing Sheets

DEVICE AND METHOD FOR SENSING AN OBJECT OR A PERSON IN THE INTERIOR OF A VEHICLE AND VEHICLE OCCUPANT PROTECTION APPARATUS IN A VEHICLE WITH SUCH A DEVICE

CROSS-REFERENCE TO RELATED APPLICATION

This application is a continuation of copending International Application No. PCT/EP00/01601, filed Feb. 25, 2000, which designated the United States.

BACKGROUND OF THE INVENTION

Field of the Invention

The invention lies in the motor vehicle technology field and relates, more specifically, to a device and a method for sensing an object or a person in an interior of a vehicle and a vehicle occupant protection apparatus in a vehicle with such a device.

Persons who are located in a position well forward in the direction of the dashboard, such as children in what are referred to as the reboard child seats on the front passenger seat, are exposed to the hazard that, while travelling in a motor vehicle provided with an airbag, they may be injured by the inflation impact of the airbag when there is an accident. Modern control systems for vehicle occupant protection means are aimed at switching off the airbag in certain situations or inflating it with a reduced force in order to avoid the risk of injury to a vehicle occupant. Preferably contactless optical sensors are used to determine the position of a vehicle occupant in the vehicle.

German published patent application DE 195 47 333 A1 discloses a device for sensing an object or a person in the interior of a vehicle. There, a sensor is provided for sensing an object or a person in the form of a thermal radiation sensor which is arranged in the headrest of the front passenger seat. A control unit for signal processing, which is connected to a control device for a vehicle occupant protection means, is arranged with the sensor.

SUMMARY OF THE INVENTION

It is accordingly an object of the invention to provide a method and a device for sensing an object or a person in the interior of a vehicle and vehicle occupant protection apparatus in a vehicle with such a device, which overcomes the above-mentioned disadvantages of the heretofore-known devices and methods of this general type and which allows checking the triggering behavior of a vehicle occupant protection apparatus in a vehicle after a triggering process.

With the foregoing and other objects in view there is provided, in accordance with the invention, a device for sensing an object or a person in an interior of a vehicle, comprising:

a sensor for sensing an object or a person in an interior of a vehicle;

a memory;

a control device for a vehicle occupant protection means, the control device outputting a control command; and a control unit connected to the memory for storing data (sensor data or data derived therefrom) in the memory upon receiving a corresponding control command from the control device, the control unit causing an impact code received via an interface to be stored in the memory.

There is also provided, in accordance with the invention, a vehicle occupant protection apparatus, comprising:

a control device for a vehicle occupant protection device configured to output a control command;

an impact sensing device connected to the control device; and a device for sensing an object or a person in the interior of a vehicle according to the above-outlined invention disposed spatially separate from and connected to the control device for receiving the control command output by the control device.

With the above and other objects in view there is also provided, in accordance with the invention, a method for sensing an object or a person in the interior of a vehicle, which comprises:

sensing with a sensor whether an object or a person is in the interior of the vehicle;

supplying sensor data to a control device, arranged spatially separate from the sensor, for a vehicle occupant protection means;

storing the sensor data in a device containing the sensor when there is a corresponding control command supplied to the device, wherein the sensor data are stored if the vehicle occupant protection means is to be triggered or is triggered.

The core of the invention resides in the fact that the device for sensing an object or a person in the interior of a vehicle, containing a sensor for sensing an object or a person, is constructed in such a way that, where necessary, it stores sensor data in an associated memory. Here, in particular the last of the sensor data which can be used as the basis for a decision for or against triggering of the associated vehicle occupant protection means are stored. In one advantageous development to the invention, it is also possible to store chronologically preceding sensor data in order to be able to follow the history of the position of an object or person.

The device itself has here an interface for connection to a control device for a vehicle occupant protection means. Via this interface, the device transmits, on the one hand, sensor data or evaluated sensor data and on the other hand receives a control command from the control device for the storage of sensor data.

The device for sensing an object or a person can be directed toward the hazard area in front of a folded-up airbag module in the inflation direction, and can thus communicate the presence of an object or a person in this area. However, sensing devices for objects or persons can also be applied which are directed toward the vehicle seat and can determine when a person is not in their normal sitting position. It is also possible to apply sensing devices which sense the entire front part of the interior of the vehicle and can detect any type of position of an object or of a person. The invention is therefore not restricted to specifically sensing an image of an object or of a person but is rather in particular also intended for monitoring specific areas in the interior of a vehicle for the presence of an object or of a person. The device is constructed here for contactless sensing.

A sensor of such a sensing device can be based on different physical operating principles:

For example, the sensor can preferably sense its operating area by means of optical radiation, in particular infrared radiation. However, radiation with other wavelengths can also be provided. The sensor contains a LED, in particular an infrared transmitter in the form of a laser diode which emits one or more beams or beam curtains. The sensor also contains one or more optical receiving elements in the form of photocells which receive the radiation which has been reflected or scattered at an object or a person. By evaluating the reflected radiation, the distance between the sensor and the object and, if appropriate, contouring and precise determination of positions in the two-dimensional or three-dimensional space can be carried out. Preferably, the sensor extends a plurality of beam curtains, arranged staggered one behind the other in the direction of travel, in the vertical plane and contains a plurality of receiving elements per beam curtain along the transverse axis of the vehicle. This ensures three-dimensional detection of persons or objects because each receiving element supplies an information item of two-dimensional significance and the third vertical dimension is acquired by evaluating the strength, the power or the energy content of reflected radiation. A sensing device with simple technical means has, for example, just one photoelectric barrier which senses the space wherein the airbag unfolds. The sensor of the sensing device can also be embodied as a video camera and supply images which are subjected to pattern recognition in the following method.

The sensor can, however, also be embodied as a thermal sensor in the form of an infrared pick-up which can determine the presence and the position of a living person by means of the thermal radiation which they give off.

In addition, ultrasonic sensors or microwave sensors can also be used.

Given active radiation of the object or the person, a position of an object or person is preferably determined using the methods of transit time measurement or triangulation.

The control device for the vehicle occupant protection means in itself is known sufficiently from the prior art. Such a control device contains a microprocessor for evaluating impact signals. These impact signals are supplied by an impact sensing device with an associated impact sensor system. Here, acceleration sensors or sensors which detect deformation of the bodywork can be used as the impact sensors. The impact sensing device with the associated impact sensors can be arranged downstream of the control device and connected to the control device via lines or a databus. This topology is predominantly used by control systems for side impact protection wherein acceleration sensors which are exported near to the application of the impact are arranged on the sides of the vehicle. Alternatively or in addition, an impact sensing device with impact sensors may be accommodated, together with the control device, in a housing which is arranged centrally in the vehicle—for example in the vehicle tunnel. For this purpose, acceleration sensors are preferably used as impact sensors.

The control device actuates one or more vehicle occupant protection means, or a vehicle occupant protection means which are selected from a plurality of vehicle occupant protection means, as a function of signals supplied by the impact sensing device. Vehicle occupant protection means are preferably airbags such as the driver's airbag, front seat passenger airbag, side airbag, head airbag, knee airbag or even seatbelt pretensioning device, rollover bars, etc. Here, the control device causes a firing element of a vehicle occupant protection means to be provided with current. The associated firing element can also have a databus as a connecting means to the control device instead of a conventional two-wire firing line and can make available energy reserves locally for firing purposes. The vehicle occupant protection means is then triggered if a coded firing command is transmitted from the control device to such a firing element provided with evaluation intelligence.

When a device is present for sensing an object or a person in the interior of a vehicle, a vehicle occupant protection means is advantageously triggered by the control device only if the object sensing device communicates that the position of a person on the vehicle seat whose associated vehicle occupant protection means is to be triggered is classified as nonhazardous for complete triggering of the vehicle occupant protection means, or that the position of a child's seat on such a vehicle seat is classified as nonhazardous for complete triggering of the vehicle occupant protection means.

On the other hand, given a position of an object or person which is classified as hazardous, the control device is capable of preventing or appropriately metering triggering of the vehicle occupant protection means, which is necessary per se owing to the strength of the impact or type of impact. Metering is possible only in a vehicle occupant protection means with two activation stages or in a controllable vehicle occupant protection means. Here, the vehicle occupant protection means is activated only to the degree permitted by the position of the person or object.

According to the invention, a decision to trigger or not to trigger for a vehicle occupant protection means can then be checked retroactively in the event of an impact. In this way, evidence can be provided of the functional capability of the vehicle occupant protection means. For this purpose, all the data which influences the decision to trigger is available in a stored form for the reconstruction of the decision to trigger. The storage according to the invention of sensor data of the sensor for sensing an object or a person and the additional storage of sensor data of the impact sensing device permits complete checking of the decision to trigger.

Here, the sensor data relating to persons and objects can itself be stored in the memory. The protection also covers the storage of signals/data derived from recorded sensor signals representing data and evaluation results of sensor data relating to persons and objects. Here, the control unit of the device according to the invention may already have carried out a signal evaluation, and for example an object which is detected as present may have been classified in terms of its position and size. Merely the position class and size class are then stored in the memory.

According to the invention, the sensor data relating to persons and objects is not stored in a memory of the vehicle occupant control device but rather in a memory which is assigned to the device for sensing an object or a person. Owing to the spatial separation of the device for sensing an object or a person, whose place of installation is determined by the type of sensor, its range and its measuring field and is, for example, the A pillar or the roof-lining, and the control device, which is preferably arranged centrally in the motor vehicle in the vehicle tunnel, a preferably electrical connection is necessary between these devices. Here, the object sensing device supplies sensor data or evaluated sensor data via a two-wire line or a databus in analog or digital form to the central control device. In one advantageous development of the invention, the object sensing device is activated, and brings about the recording and subsequent transmission of sensor data, only if the central control device detects, on the basis of data of the impact sensing device, at least one start of an impact is detected, for example as a result of a minimum deceleration being exceeded.

As a result of the storage of the sensor data directly in the object sensing device as independent electrical equipment with the sensor, the control unit, the memory, a power supply and an interface, which is then necessary for documenting the decision to trigger, the expenditure in the form of memory space and computing power which is to be made available in the central control device can be reduced or kept low. The data transmission rate between the object sensing device and control device is also reduced because sensor data transmission which may possibly be necessary only for the purpose of storing data in the central control device is avoided on the part of the object sensing device.

In one advantageous development of the invention, the central control device generates a control command for storing sensor data in the object sensing device, and transmits it to the object sensing device if an impact which is sufficiently strong to trigger a vehicle occupant protection means is detected together with a position of a person or object, permitting at least partial triggering of the vehicle occupant protection means. Such a control command is preferably also generated for further exported impact sensors. The sensors which are arranged in the central control device for impact detection also store their values which have been determined last, in a memory of the central control device.

This control command which is transmitted to the object sensing device is preferably also generated if a sufficiently strong impact but not a position of a vehicle occupant which justifies triggering of the vehicle occupant means is detected, and triggering of the vehicle occupant protection means is thus suppressed owing to the sensor data of the object sensing device. Such a decision is nevertheless highly significant for the best possible protection of the person and is therefore desirable for it to be capable of being traced back.

In a further advantageous development of the invention, the recording of sensor data in the object sensing device is already started at an early time at which a decision about the triggering or non-triggering of a vehicle occupant protection means has not yet been made. Here, a corresponding control command is transmitted from the central control device at the start of an impact. A start of an impact is detected in particular by virtue of the fact that one or more signals of the impact sensing device exceed(s) a minimum limiting value, and thus indicate the start of an impact which is possibly growing stronger. Such a start of an impact can, however, also be defined by reference to signals of other equipment/sensors which record the vehicle dynamics. Such signals can preferably be supplied by a control system for vehicle movement dynamics, by a brake booster, by an antilock control system or by distant sensors for determining the distance between the vehicle and an obstacle. The storage capacity in the object sensing device can then be in particular dimensioned in such a way that sufficient storage space is provided for all the sensor data records which are determined from the start of an impact up to a decision to trigger or not to trigger, or else up to a fixed time from the start of the impact. If, for example, the object sensing sensor is operated with one sensing operation per millisecond, the storage space is dimensioned in such a way that 50 sensor data records which represent the variation of the position of the vehicle occupant or object within 50 ms from the start of an impact can be stored. At the end of such a time period or when a decision to trigger or not to trigger is made, the control unit of the object sensing device makes the memory incapable of being written to any more. Here, for example, a corresponding flag is set, which makes it possible to perform further writing to the memory which is preferably non-erasable and embodied in particular as an EEPROM. Alternatively, a corresponding control command can also be generated by the central control device, which is correspondingly subsequently implemented by the control unit of the object sensing device.

In one advantageous development of the invention, only one sensor data record which represents an image of a position of an object or vehicle occupant at a specific time is stored in the memory. If here the writing of the corresponding sensor data into the memory is started at the time of the start of an impact, the respective sensor data record which has previously been stored is overwritten again. Here, the control unit itself or the central control device also ensures that writing of sensor data in the memory is aborted or terminated, or writing to the memory is made impossible, at least once a decision to trigger has been taken.

In a further advantageous development of the invention, when the start of an impact is communicated but triggering has not taken place, the sensor data is not retained or evaluated any further. The central control device transmits a corresponding control command to the object sensing device which releases the memory for further data recordings and if appropriate erases it beforehand.

Other features which are considered as characteristic for the invention are set forth in the appended claims.

Although the invention is illustrated and described herein as embodied in a device and method for sensing an object or a person in the interior of a vehicle and vehicle occupant protection apparatus in a vehicle with such a device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
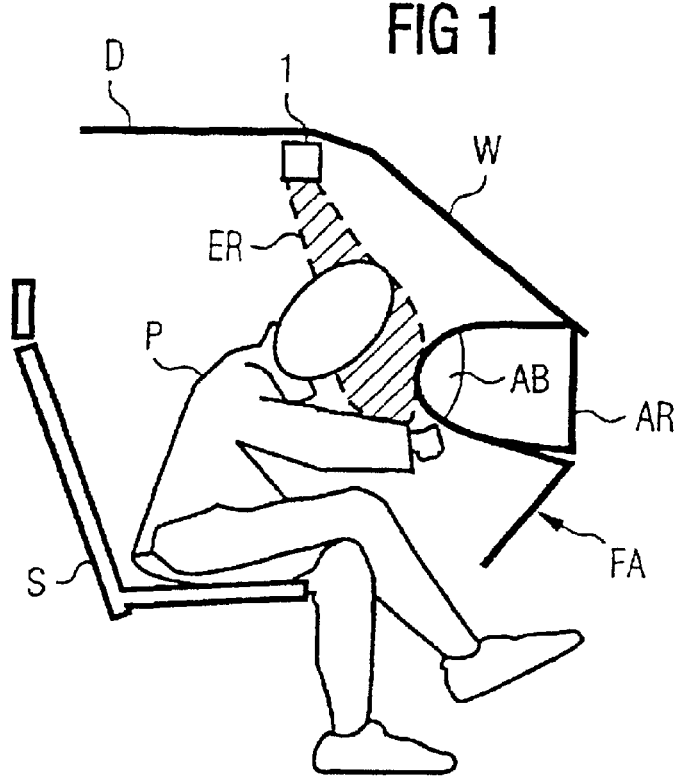
FIG. 1 is a diagrammatic sectional view of a passenger cell, on the front seat passenger side.

Referring now to the figures of the drawing in detail and first, particularly, to FIG. 1 thereof, there is shown a section of the front passenger cell, on the front seat passenger side, all the elements being indicated symbolically. The passenger compartment of the vehicle is bounded here by a roof D, a windshield W, a dashboard AR and a footrest FA. However, the roof D, and thus a closed passenger cell, does not necessarily have to be present to bound the passenger compartment of the vehicle. A person P is seated on a vehicle seat S, in a position with the upper part of the body moved forward. A device for sensing an object or a person is arranged on the roof D. This device has an operating area ER which is indicated. The dashboard AR contains a front seat passenger airbag module AB in the folded-up state. In the unfolded state, the front seat passenger airbag shoots in the direction towards the head of the person P.

Figure 2:
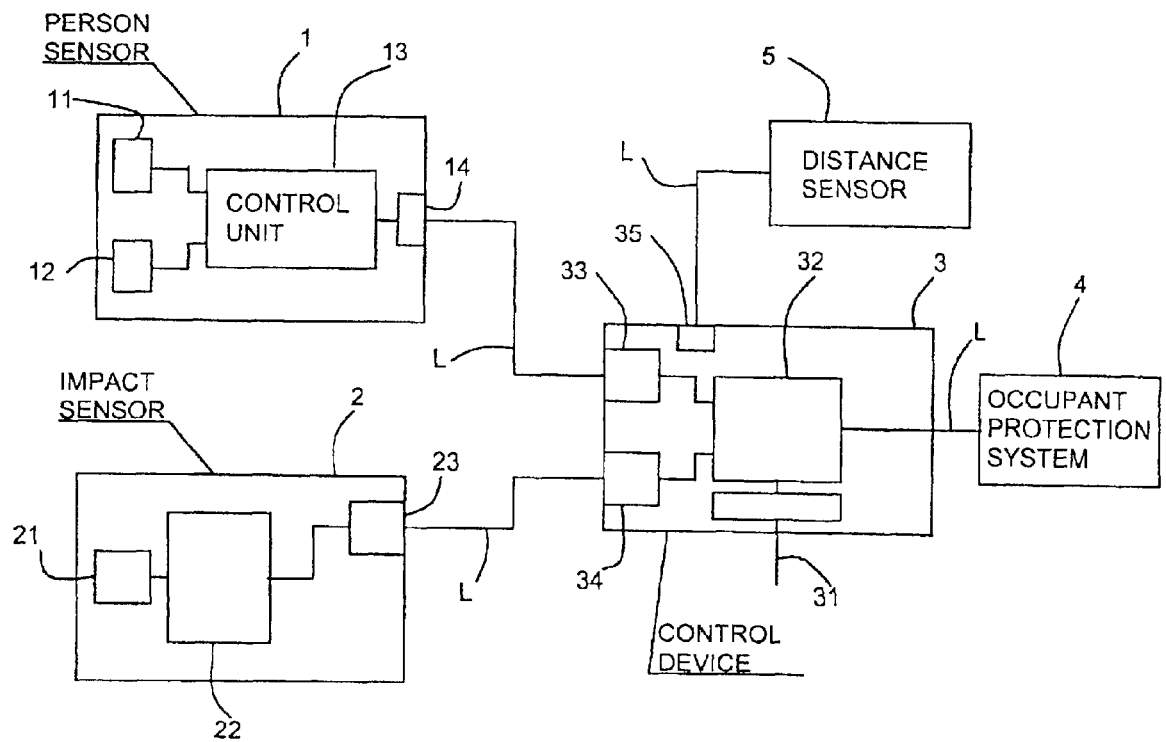
FIG. 2 is a block circuit diagram of the apparatus according to the invention.

FIG. 2 shows a block diagram of an apparatus according to the invention. The assembly includes a device 1 for sensing an object or a person in the interior of a vehicle, a device 2 for sensing an impact, a distance sensor 5 and a control device 3 for a vehicle occupant protection means 4.

The devices 1, 2, 5 and 3 and the vehicle occupant protection means 4 are arranged spatially separated from one another here and are connected to one another via lines L, as illustrated in FIG. 2.

The object sensing device 1 contains a sensor 11 for sensing an object or a person, a nonvolatile memory 12, a control unit 13 and an interface 14. The impact sensing device 2 contains an impact sensor 21, a control unit 22 and an interface 23.

The control device 3 contains three interfaces 33, 34 and 35, an impact sensor 31 and a control unit 32. The radar distance sensor 5 is arranged on the fender of the motor vehicle and detects the approach of an obstacle. The devices 1, 2, 3 and 5 are preferably embodied as separate pieces of electrical equipment, preferably with a separate housing and a separate power supply.

The impact sensors 21 and 31 are, for example, configured as acceleration sensors. The acceleration sensor 21 is arranged exported in the front part of the vehicle in order to detect a side impact, while the acceleration sensor 31 is arranged centrally in the control device 3, for example at the center of gravity of the motor vehicle, in order to detect a head-on collision. The control unit 22 of the impact sensing device 2 carries out signal processing of the signal supplied by the impact sensor 21 and transmits correspondingly conditioned signals via the interface 23, the line L and the interface 34 to the control unit 32 to the central control device 3. The signals of the central impact sensor 31 are fed directly to the control unit 33.

Preferably impact states which are determined by the signal processing circuit 22 and are classified on the basis of to their intensities are used as transmitted signals from the impact sensing unit. The sensor 11 of the object sensing device 1 supplies its signals to the control unit 13, which essentially carries out signal processing routines. The control unit 13 is, however, also used to actuate the sensor 11 if it is of controllable design. The control unit 13 transmits preferably evaluated sensor data to the central control device 3 via the interface 14, the line L and the interface 33. Here, state data relating to the sensed area is preferably transmitted. Individual data for this may have the content: "Person detected in hazard area", "Object detected in hazard area", "No object or person detected in hazard area".

The control unit 32 of the central control device 3 processes the supplied data algorithmically. On the basis of fixed processing rules, the control unit 32 ultimately takes the decision on the basis of the supplied data as to whether or not the vehicle occupant protection means 4 which is connected via the line L is triggered. When a plurality of vehicle occupant protection means are connected, the control unit 32 also takes the decision as to which of the vehicle occupant protection means 4 is triggered.

Figure 3A:
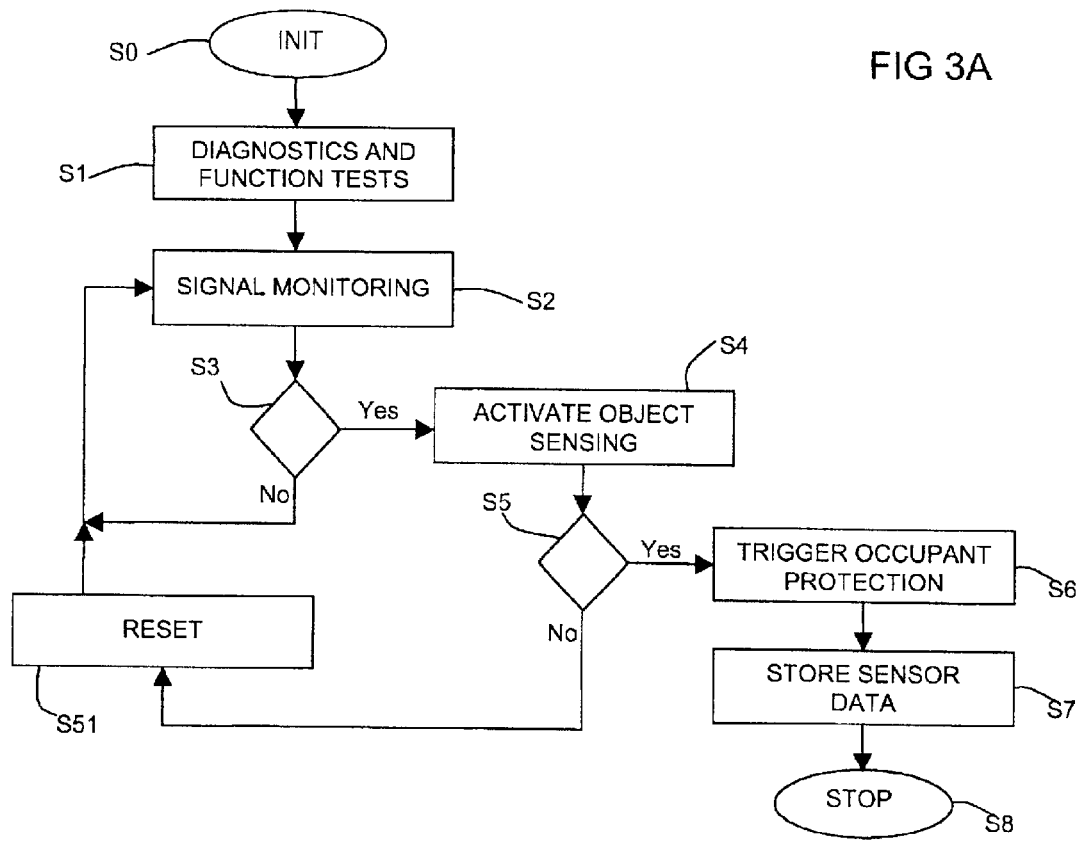
FIG. 3A is a flowchart illustrating a method according to the invention.

FIG. 3 shows flowcharts of two methods according to the invention in diagrams 3A and 3B. Here, the step S0 in FIG. 3A characterizes the initialization of the vehicle occupant protection apparatus, for example as a consequence of an activation of the vehicle's ignition system. In step S1, initial diagnostic routines are carried out within the apparatus and at the same time, for example, the functional capability of the object sensing device and of the impact sensing device, together with functionality of firing units, are checked. In step S2, monitoring of the signals of the impact sensors for the start of an impact is started. Here, in step S3 it is checked whether the acceleration signal of an impact sensor exceeds a minimum threshold. If this is not the case (no) according to step S3, monitoring of the impact signals is continued.

However, if a start of an impact is detected (yes), the object sensing device is activated with step S4 and thus made to record images. If a strong impact which is sufficient to trigger an occupant protection means is detected in step S5 as a result of continuous monitoring and evaluation of impact signals, and at the same time a position of a vehicle occupant which does not impede inflation of the associated airbag is detected, in step S6 the central control unit directs an ignition command to the associated vehicle occupant protection means. In step S7, a control command is output directly after step S6 (if appropriate even before step S6 or at the same time as step S6) by the central control device 3 to the object sensing device 1, with the content that the sensor data determined last should be stored. The method is terminated with step S8. If the trigger conditions are not fulfilled (no), at least within a predefined time from the start of the impact with step S5, in step S51 the calculations made up to then are reset and the presence of a start of an impact is determined with step S2.

Figure 3B:
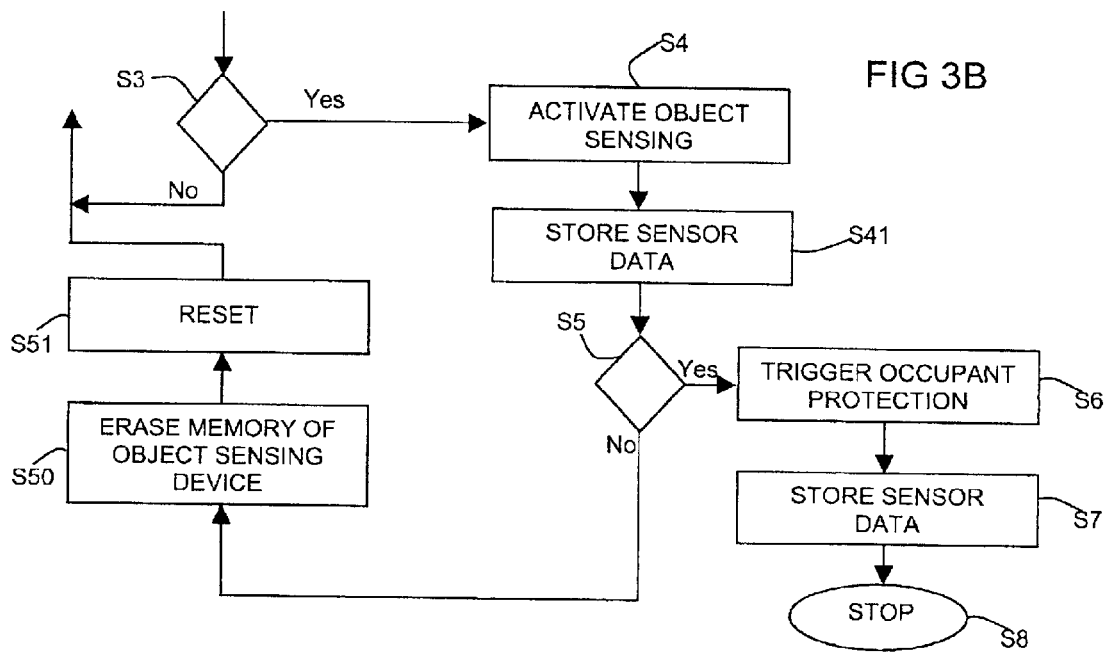
FIG. 3B is a flowchart illustrating another method according to the invention.

FIG. 3B shows a further flowchart of a method according to the invention, the method being started with step S3 from the diagram of FIG. 3A in the explanation. If a start of an impact is detected (yes), the object sensing device is activated with step S4. Then, in step S41, the central control device makes the object sensing device store sensor data in the memory of the object sensing device. If the conditions for the triggering of a vehicle occupant protection means are fulfilled (yes) with step S5, the vehicle occupant protection means is in turn fired with step S6. With step S7, the data recording is then terminated in the object sensing device, in contrast to the method according to FIG. 3A. However, if triggering of the vehicle occupant protection means is decided against (no) in step S5, the memory of the object sensing device is erased with step S50 and a reset of all the calculations is carried out with step S51.

However, sensor data can be recorded not only when there is an imminent impact but also cyclically while the vehicle is operating. At predefined times, which are in particular also selected cyclically, the control command for the recording of the sensor data in the memory is then issued by the control device. The memory is then preferably embodied as a toroidal-core store or toroidal memory.

We claim:

1. A vehicle occupant protection apparatus, comprising:
   a control device for a vehicle occupant protection device configured to output a control command;
   an impact sensing device connected to said control device; and
   a device for sensing an object or a person in the interior of a vehicle disposed spatially separate from and connected to said control device for receiving the control command output by said control device, said device including:
   a sensor for sensing an object or a person in an interior of a vehicle;
   a memory; and
   a control unit connected to said memory for storing sensor data or data derived therefrom in said memory upon receiving a corresponding control command from said control device, said control unit causing an impact code transmitted via an interface to be stored in said memory.

2. The apparatus according claim 1, wherein said control device is programmed to output the control command if the vehicle occupant protection means is triggered.

3. The apparatus according to claim 1, wherein said control device is configured to output the control command as a function of an impact signal of said impact sensing device.

4. The apparatus according to claim 1, wherein said control device is configured to output the control command if a start of an impact is detected when an impact signal exceeds a given threshold value.

5. A method for sensing an object or a person in an interior of a vehicle, which comprises:

sensing with a sensor whether an object or a person is in the interior of the vehicle;

supplying sensor data or data derived therefrom to a control device, arranged spatially separate from the sensor, for a vehicle occupant protection means;

storing the sensor data or data derived therefrom in a device containing the sensor when there is a corresponding control command supplied to the device, wherein the sensor data or data derived therefrom is stored if the vehicle occupant protection means is to be triggered or is triggered.

6. The method according to claim 5, which comprises storing the sensor data or data derived therefrom if a start of an impact is detected.

7. The method according to claim 6, which comprises terminating the storing step if the vehicle occupant protection means has not been triggered.

* * * * *